Sept. 11, 1973   J. S. WHITESIDES   3,758,279

RADIAL FLOW REACTOR

Filed April 26, 1971   2 Sheets-Sheet 1

INVENTOR.
J. S. WHITESIDES

BY

ATTORNEYS

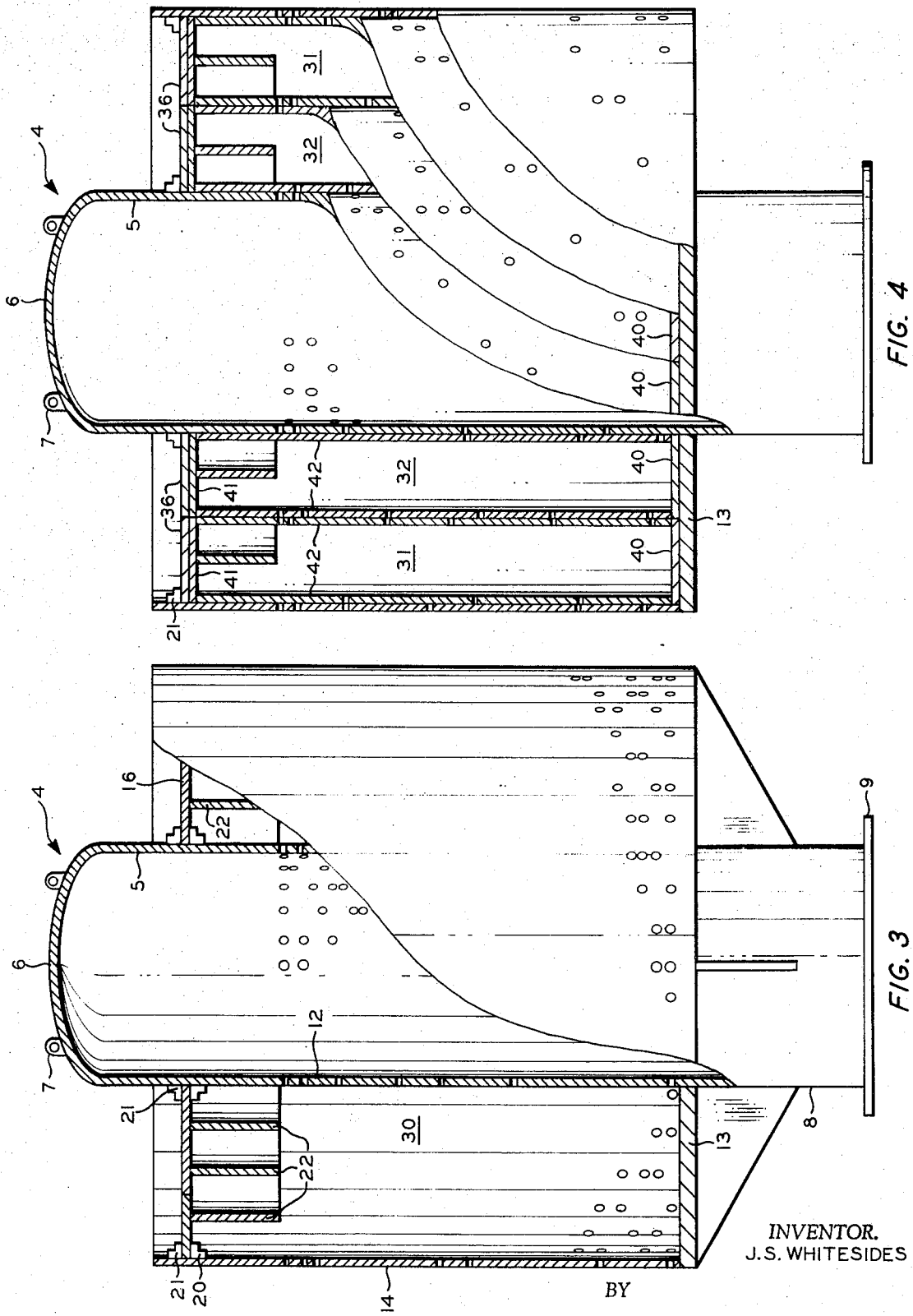

United States Patent Office 3,758,279
Patented Sept. 11, 1973

3,758,279
RADIAL FLOW REACTOR
John S. Whitesides, Borger, Tex., assignor to Phillips Petroleum Company
Filed Apr. 26, 1971, Ser. No. 137,439
Int. Cl. B01j 9/04
U.S. Cl. 23—288 R   1 Claim

ABSTRACT OF THE DISCLOSURE

A radial flow reactor having a removably positionable catalyst basket positionable peripherally to an upwardly-extending conduit closed at its upper end and having an apertured wall for exit of reactants flowing through the catalyst bed.

---

This invention relates to radial flow reactors.

In one of its more specific aspects, this invention relates to a radial flow reactor having characteristics which facilitate catalyst removal.

In certain catalytic processes, the catalyst becomes expended and requires removal from the vessel in which it is packed. Since flow of the reactants through the catalyst bed during the operating period tends to compress the catalyst bed, removal of the catalyst from the bed is usually difficult. This is particularly true in those cases in which the reactor is a radial flow reactor, that is, one in which the materials being processed flow radially inward through a bed of catalyst and into a chamber communicating with an outlet conduit.

This invention solves this problem by providing a radial flow reactor comprising a chamber having an inlet and an outlet, the outlet extending upwardly into the vessel, flow from the chamber taking place through apertures in the wall of the outlet, the outlet being closed at its uppermost end.

A catalyst basket is removably positionable within the chamber peripheral to the outlet conduit to form an annulus between the outside of the catalyst basket and the inner wall of the chamber and to define a flow path from the inlet of the chamber into the annulus and through the catalyst bed, then through the apertured conduit and from the chamber. The basket is removable in conjunction with a section of the outlet conduit.

Figure 1:
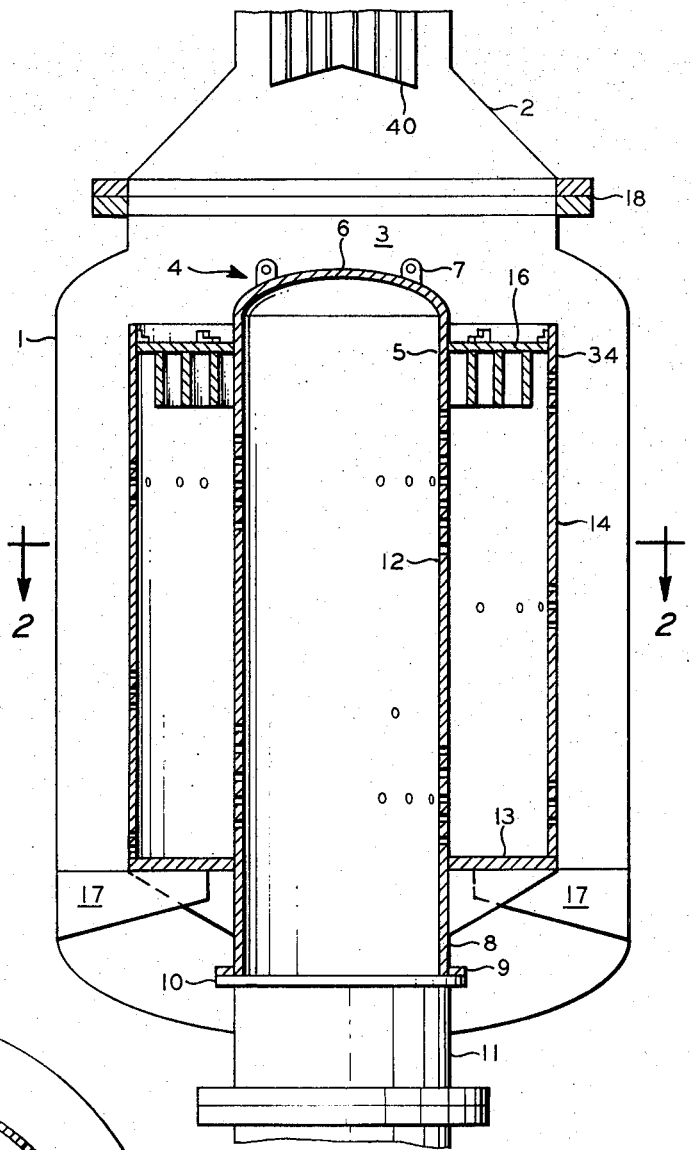
Figure 2:
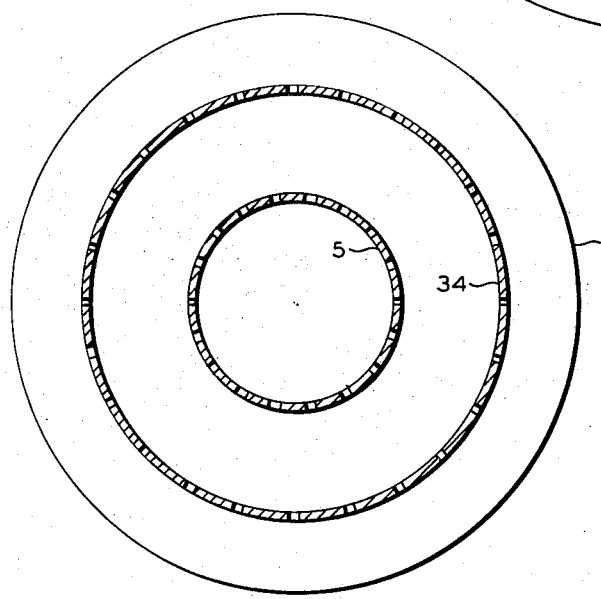

The apparatus of this invention will be more easily understood if explained in conjunction with the attached drawings in which FIG. 1 is an elevational view of one embodiment of the apparatus of this invention; FIG. 2 is a cross-sectional view of FIG. 1 through section 2—2 thereof; FIG. 3 is an elevational view of the removable catalyst basket section of the reactor of FIG. 1, and FIG. 4 is a second embodiment of the apparatus of FIG. 1.

Referring now to FIG. 1 there is shown reactor 1 being flangedly connected to inlet conduit 2 through which reactants enter chamber 3. Positioned at the inlet to the chamber can be situated diffuser 40 which acts to distribute the incoming reactants within the chamber.

Positioned within chamber 3 is removable catalyst basket 4. This section is composed of several integral sections, one section of which is central conduit 5 closed at its one end by plate 6 to which are affixed lifting means, for example lugs, 7. At some portion of the conduit below the upper level of the after-described catalyst beds, the conduit has a foraminous wall 12. At its opposite end 8, the conduit is adapted with flange 9 which is positionable in matching and gasketed relationship to flange 10 of outlet conduit 11.

Positioned around the periphery of conduit 5 and integral with it is catalyst basket 34. This basket is closed at its lower extremity by plate 13. Outer wall 14 and inner wall 12 are comprised of apertured or foraminous members. The basket is closed at its upper end by removable positionable plate 16.

Positioned within the chamber are any suitable number of support members 17 which are affixed to the wall of the chamber and project inwardly and are positioned in gasketed supporting relationship to the basket, plate 13 coming in contact with the support members 17. At its inlet end, chamber 3 is adapted with flange 18 which is of sufficient size as to permit the removal of basket 4 therethrough.

FIG. 2 is a plan view through section 2—2 of FIG. 1.

FIG. 3 is a view in elevation of removable catalyst basket section removed from chamber 3. It will be seen that plate 16 is removable from the section, being held in place by supports 20 and clips 21. Suspended from plate 16, which can be composed of two or more sections, are deflectors 22 up around which the catalyst is positioned and which insure passage of the reactants through the catalyst bed even after shrinkage of the catalyst bed has taken place and by-passage of the catalyst bed would otherwise occur.

With the basket removed from the chamber, plates 16 are removed and catalyst 30 is positioned within the basket, the catalyst being supported on plates 13 and being retained by conduit wall 12 and outer foraminous wall 14. With the catalyst basket filled to a position well above the lower terminus of plates 22, plates 16 are positioned and the entire basket positioned within the chamber by means of lugs 7 so as to form a sealed joint between flange 9 of the basket and flange 10 of the outlet conduit.

While the catalyst can be composed of a single bed of a plurality of beds, it can also be composed of a plurality of units which are individually removable. This embodiment is shown in FIG. 4.

Referring now to FIG. 4 there is shown the same general arrangement as is shown in FIG. 3 with the exception that the catalyst bed is composed of a plurality of concentrically positioned sections, or cartridges, represented by the two sections 31 and 32, although a greater number can be employed, each of which is closed by a bottom member 40 and upper member 41 and foraminous side members 42. With each section seated in sealed relationship to plates 13 and plates 36, flow is through each section consecutively. However, since catalyst activity, and hence catalyst life, can vary through the thickness of the bed, each of the sections is independently removable from the basket and chamber, and upon removal of either plate 40 or 41, catalyst can be replaced in either of the sections as desired. Similarly, central conduit 5 is removable with section 31. This embodiment enables maximumization of catalyst life or the utilization of a plurality of different characteristic catalysts in successive contacts with the reactants in a radial flow reactor. It further permits omission of one or more catalyst cartridges with the advantageous results that adjustment of contact time in accordance with feed or product requirements can easily be made.

Referring again to FIG. 1, the flow through the unit is substantially the same regardless of which embodiment is employed. Reactant flow will be through inlet conduit 2 and into that annulus formed between the basket and the inner wall of the chamber. From the annulus, the reactants flow through foraminous wall 14, across the catalyst bed and through foraminous wall 12 and downwardly and out through conduit 11.

It will be evident that various modifications can be made to the method of this invention. Such are considered, however, to be within the scope of the invention.

What is claimed is:
1. A radial flow reactor which comprises:
  (a) a chamber having an inlet and an outlet, said outlet comprising a conduit extending upwardly into said chamber, said conduit being closed proximate the inlet of said chamber and opening into said chamber through a plurality of apertures formed in the wall of said conduit in spaced relationship along the vertical axis of said conduit, said conduit being severable proximate the outlet end of said chamber; and (b) a catalyst basket positionable wthin said chamber peripheral to said conduit and in continuous contact relationship with said conduit over a substantial portion of the apertured wall of said conduit to form an annulus between the inner wall of said chamber and the outer wall of said catalyst basket, said basket being provided with a plurality of vertically positioned deflectors extending downward into said basket, said basket being positioned to define a flow path from said inlet of said chamber through said annulus and into a catalyst bed positioned in said basket, said basket being comprised of a plurality of sections positioned in contact with and concentrically to said conduit and to each other, said sections being individually removable from said basket and said basket being removable with said conduit from said chamber through said inlet of said chamber.

References Cited

UNITED STATES PATENTS

| | | | |
|---|---|---|---|
| 2,279,153 | 4/1942 | Wilcox | 23—288 R X |
| 2,338,346 | 1/1944 | Mather | 23—288 R |
| 2,969,318 | 1/1961 | Woodall | 23—288 R X |
| 3,027,244 | 3/1962 | Byrne et al. | 23—288 R |
| 3,051,561 | 8/1962 | Grimes | 23—288 R |
| 3,494,114 | 2/1970 | Nelson et al. | 55—482 |
| 3,620,685 | 11/1971 | Rogers et al. | 23—288 R |

FOREIGN PATENTS 183,084   9/1955   Germany.

BARRY S. RICHMAN, Primary Examiner

U.S. Cl. X.R.

23—285; 55—482; 210—282, 284